United States Patent
Shang (10) Patent No.: US 10,243,780 B2
(45) Date of Patent: Mar. 26, 2019

(54) DYNAMIC HEARTBEATING MECHANISM

(71) Applicant: VMware, Inc., Palo Alto, CA (US)

(72) Inventor: Jingliang Shang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 143 days.

(21) Appl. No.: 15/189,619

(22) Filed: Jun. 22, 2016

(65) Prior Publication Data

US 2017/0373926 A1    Dec. 28, 2017

(51) Int. Cl.
*G06F 15/16*    (2006.01)
*H04L 12/24*    (2006.01)
*H04L 12/26*    (2006.01)

(52) U.S. Cl.
CPC ...... *H04L 41/0654* (2013.01); *H04L 41/0893* (2013.01); *H04L 43/0817* (2013.01); *H04L 43/10* (2013.01)

(58) Field of Classification Search
USPC ........................................... 709/209
See application file for complete search history.

(56) References Cited

U.S. PATENT DOCUMENTS

2007/0288585 A1 * 12/2007 Sekiguchi ........... G06F 11/2038
                                                                 709/209
2008/0281938 A1 * 11/2008 Rai ...................... G06F 15/177
                                                                 709/209

* cited by examiner

*Primary Examiner* — Hee Soo Kim
(74) *Attorney, Agent, or Firm* — Loza & Loza, LLP (57) ABSTRACT

System and method for providing failover protection for a cluster of host computers operates in one of two modes. When the number of host computers in the cluster is equal to or less than a threshold number, the host computers in the cluster operate in an all-active heartbeating mode in which each of the host computers is enabled to function as a master node. When the number of host computers in the cluster is greater than the threshold number, the host computers in the cluster operate in a distributed heartbeating mode in which some of the host computers function as master nodes and at least one of the host computers functions as a slave node.

24 Claims, 9 Drawing Sheets

DYNAMIC HEARTBEATING MECHANISM

BACKGROUND

Current High Availability (HA) cluster server products use heartbeating methods to monitor the health and status of each host computer in a cluster of host computers. These heartbeating methods may involve the utilization of both network heartbeats and storage heartbeats to identify failures as well as suppress false alerts.

One particular heartbeating method of interest uses a single elected host computer as a master node to monitor all other host computers that function as slave nodes. In this method, the slave nodes send network heartbeat messages to the master node periodically, e.g., every 1 second, and the master node replies to the messages. If a network heartbeat message is missing from any slave node, the master node determines the state of that slave node via an Internet Control Message Protocol (ICMP) ping check and a storage heartbeat check. If both checks fail, then the master node triggers a failover for that slave node. When a network heartbeat reply is missing from the master node, an election will take place and a new master node will take control of the ping check and the storage heartbeat check with respect to the old master node. If these checks fail, the new master node starts a failover operation for the old master node.

The above heartbeating method works well for cases of slave node failures. However, there are concerns with respect to this heartbeating method for cases of master nod failures and network isolations or partitions.

For master node failures, the above heartbeating method does not respond as quickly as desired. By design, cluster-level actions, such as failovers, are triggered by the master node. Thus, in case of master node failure, a new master node must be elected before any action can be taken, which causes significant delay (e.g., 30 seconds). In addition, since only the master node maintains the overall inventory of the whole cluster while slave nodes only know about the local inventory, the new master node must collect inventory information from all the slave nodes before any action can be taken, which causes additional delay (e.g., about 5-10 seconds). Typically, responses to master node failures are approximately 30-45 seconds slower than responses to slave node failures. Moreover, if the new master node fails to quickly collect the latest inventory information, the new master node is unable to determine slave nodes that have just failed, which may cause inconsistencies or false alerts.

Similarly, for network partition/isolation cases, the above heartbeating method does not respond as quickly as desired. In network partition cases, nodes are separated into groups and some slave nodes cannot communicate with the master node. Thus, a new master node must be elected in each partition before any action can be taken, which causes significant delay. In network isolation cases, all the nodes cannot communicate with each other. Thus, all the nodes must take time to detect the isolation, which may include a silent election and several network communication timeouts. Typically, responses to network partitions or isolations are approximately 45 seconds slower than responses to slave node failures.

Another concern with the above heartbeating method is that the method is not well suited for supporting a large scale cluster. This is due to the fact that only one master node monitors heartbeats for all the slave nodes in the cluster. As the number of slave nodes increases, the performance of the method is reduced accordingly. Thus, there is a practical limitation to the size of the cluster that can be supported by the method.

BRIEF DESCRIPTION OF THE DRAWINGS

Throughout the description, similar reference numbers may be used to identify similar elements.

DETAILED DESCRIPTION

Figure 1:
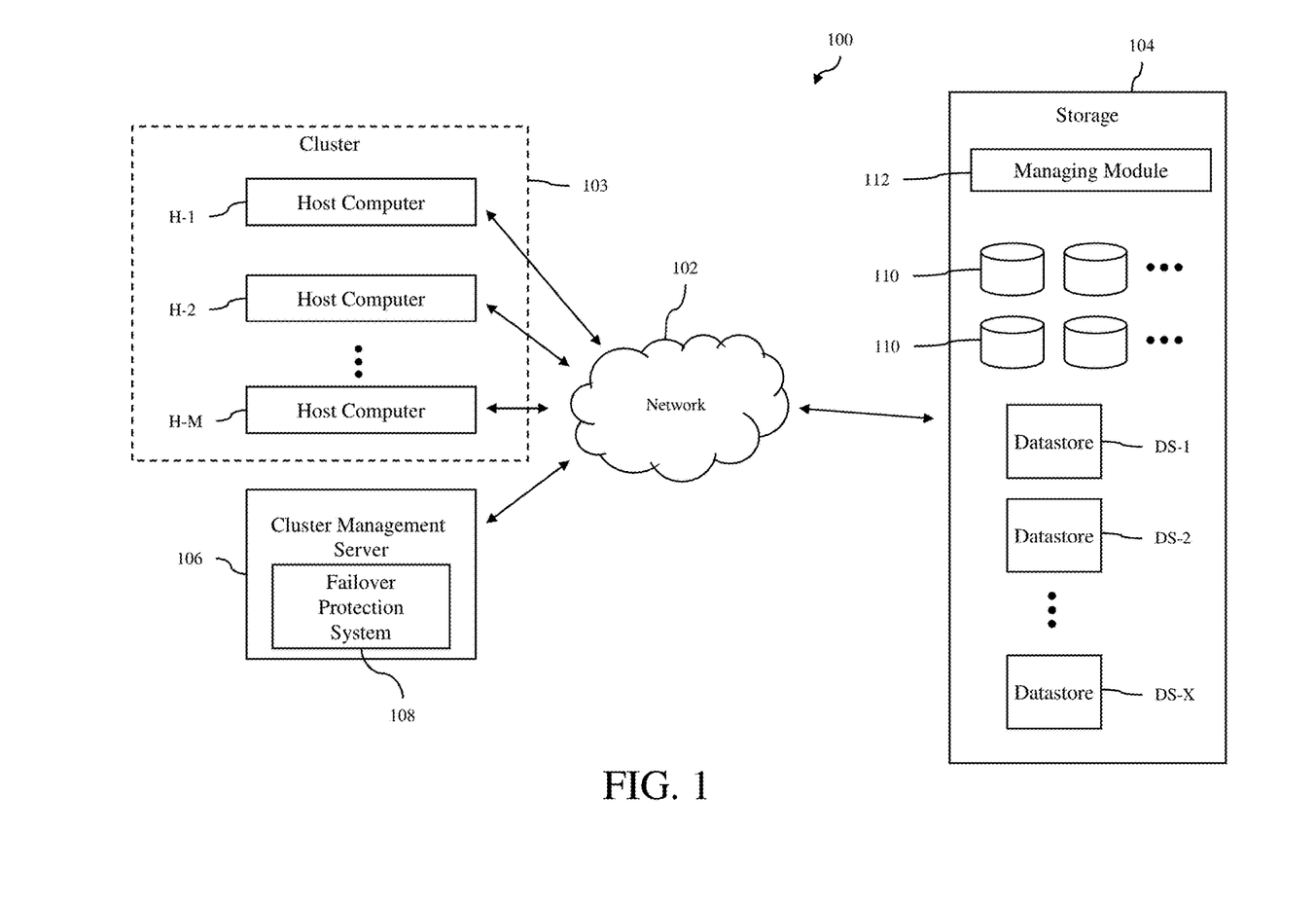
FIG. 1 is a block diagram of a distributed computer system in accordance with an embodiment of the invention.

FIG. 1 depicts a distributed computer system 100 that provides a dynamic failover mechanism in accordance with an embodiment of the invention. The distributed computer system can support a number of clients that can run various applications, such as large scale applications, in one or more clusters of host computers. As used herein, a large scale application is an application that requires multiple clients to run, such as a multi-tier application. An example of a multi-tier application is a web service application with a web tier, database tier and an application tier. As also used herein, "clients" refer to any software entities that can run on a computer system, such as software applications, software processes, virtual machines (VMs) and "containers" that provide system-level process isolation. As described in detail below, the failover mechanism of the distributed computer system 100 uses multiple failover management approaches for different sized clusters, which can reduce response times for failover initiations and increase the number of host computers that can be supported in a single cluster.

As illustrated in FIG. 1, the distributed computer system 100 includes a network 102, a cluster 103 of host computers H-1, H-2 . . . H-M (where M is a positive integer), storage 104 and a cluster management server 106 with a failover protection system 108. The host computers, the storage and the cluster management server are connected to the network. Thus, each of the host computers is able to access the storage via the network and may share the resources provided by the storage with the other host computers. Consequently, any process running on any of the host computers may also access the storage via the network. In the illustrated embodiment, the distributed computer system includes only one cluster of host computers. However, in other embodiments, the distributed computer system may include multiple clusters of host computers with associated cluster management servers.

The host computers H-1, H-2 . . . H-M of the cluster 103 are physical computer systems that host or support one or more clients so that the clients are executing on the physical computer systems. The host computers may be servers that are commonly found in data centers. As an example, the host computers may be servers installed in a single server rack. However, in other embodiments, the host computers may be installed in multiple server racks in the same or different facilities.

Figure 2:
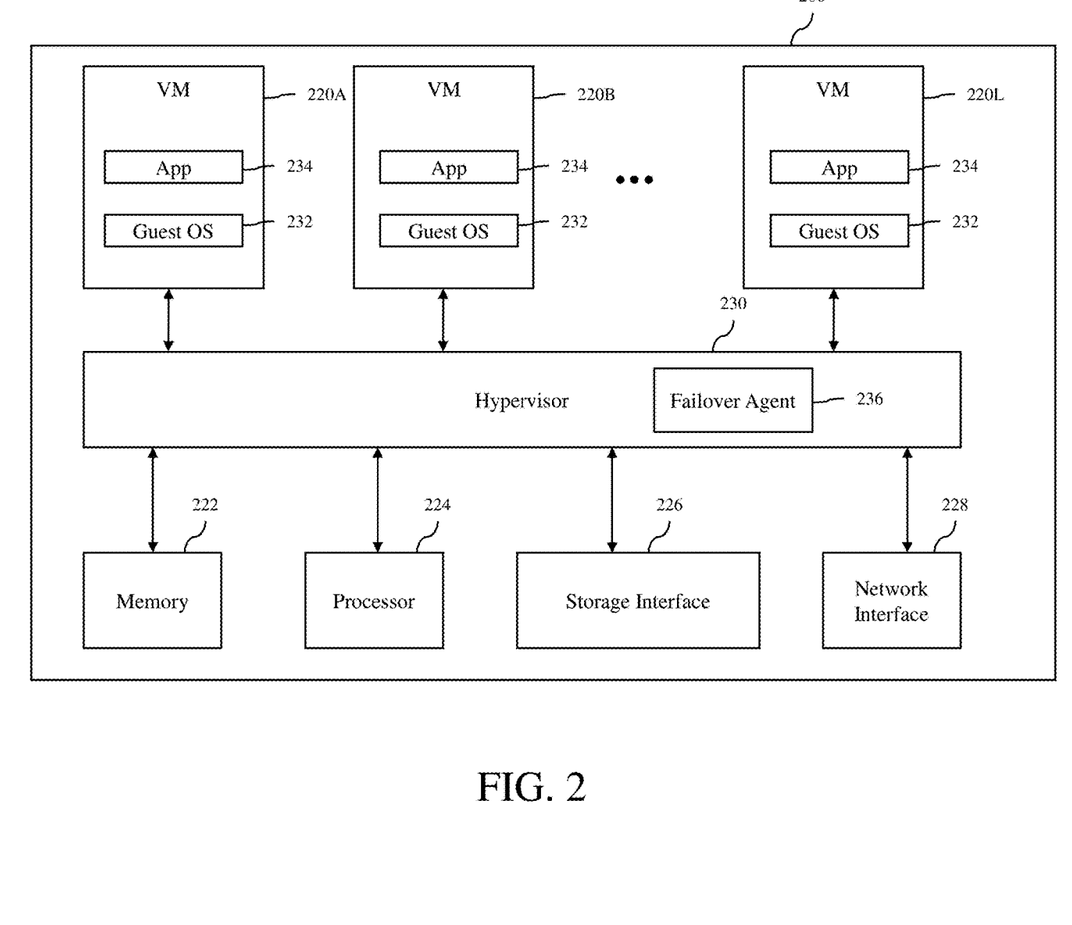
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by the hypervisor, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

As shown in FIG. 2, the host computer also includes a failover agent 236, which can be a part of the failover protection system 108 of the cluster management server 108. The failover agent of the host computer operates with the failover agents of other host computers in the same cluster to monitor the host computers in the cluster for failures. The failover agent may function as a master, during which the host computer can be considered to be a master node. The failover agent may alternatively function as a slave, during which the host computer can be considered to be a slave node. As described in more detail below, the designation of the failover agent as a master or a slave will depend on the number of host computers that currently belong to the same cluster and when the host computer joins the cluster.

If the failover agent 236 is functioning as a master so that the host computer 200 is a master node, the failover agent periodically sends heartbeat messages to all the other master nodes, i.e., the other host computers in the same cluster with failover agents that are functioning as masters. As a master node, the failover agent also responds to each heartbeat message from the other master nodes in the same cluster by sending a heartbeat response message. Each heartbeat response message may include at least information of all the master nodes in the cluster. If local inventory information has changed since the last heartbeat response message, the failover agent may also send out the local inventory information together with heartbeat message. Local inventory information may include physical and virtual resource information of the host computer, such as available memory, CPU and storage resources. The failover agent may also update or generate storage heartbeat data, which is stored in the storage 104.

As a master node, when one or more other "master" failover agents fail to send the heartbeat response message, which may be due to some failure or removal from the cluster, the failover agent 236 starts a failure verification process. In an embodiment, the failure verification process includes an ICMP ping check and a storage heartbeat check. An ICMP ping check involves sending an echo request to a target host computer and waiting to receive an echo reply from the target host computer. A storage heartbeat check involves accessing the storage to see if the target host computer has recently updated or generated a storage heartbeat. This verification process is performed by all the other healthy master failover agents of the cluster that have not received the heartbeat response message from the "failed" master failover agent. These healthy master failover agents compete for taking failover action by trying to acquire the storage lock for each of the "failed" master failover agents. Since only one master failover agent will successfully acquire the storage lock for each "failed" master failover agent, there will be no inconsistencies or false alarms.

As a master node, if the failover agent 236 has one or more failover agents functioning as slave nodes, the failover agent will expect to receive a slave heartbeat message from each of these slave nodes at a predefined time interval. If a slave heartbeat message is missing from one of the slave nodes at the expected time, the failover agent will initiate a verification process, which may involve an ICMP ping check and a storage heartbeat check. If that slave node has indeed failed, the failover agent will start the failover action for that slave node.

If the failover agent 236 is functioning as a slave node, the failover agent periodically sends a slave heartbeat message to its master node. The failover agent also updates storage heartbeat data for the host computer 200, which is stored in the storage 104. If the master node fails to reply to a slave heartbeat message, the failover agent will initiate a verification process, which may involve an ICMP ping check and a storage heartbeat check on the master node. If the master node has indeed failed, the failover agent will coordinate with the other slave nodes of the master node to have an election to pick a new master node to take over the role of the failed master node.

The failover agent 236 works with the failover protection system 108, as well as other failover agents of host computers in the same cluster. The interoperation of failover agents of the host computers H-1, H-2 . . . H-M in the cluster 103 and the failover protection system will be described in more detail below.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-M. For virtual machines, the datastores may be used to store virtual storage, e.g., virtual disks, used by each of the virtual machines, as well as other files needed to support the virtual machines. In addition, one or more datastores are used to store storage heartbeat data for the host computers H-1, H-2 . . . H-M. Multiple datastores are typically associated with each cluster of host computers. The same datastore may be associated with more than one cluster.

The cluster management server 106 operates to monitor and manage the host computers H-1, H-2 . . . H-M in the cluster 103. The cluster management server may control the addition of host computers in the cluster or the removal of host computers from the cluster. The cluster management server may be configured to monitor the current configurations of the host computers and the clients running on the host computers, for example, virtual machines (VMs). The monitored configurations may include hardware configuration of each of the host computers, such as CPU type, multi-processor memory architecture and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the cluster management server.

The cluster management server 106 also performs operations for failover protection of the host computers H-1, H-2 . . . H-M in the cluster 103. As illustrated in FIG. 1, in an embodiment, the cluster management server include the failover protection system 108, which can be enabled by a user, to perform failover protection for the cluster 103, which involves restarting applications on failed host computers, such as VMs, on other host computers. The failover protection system operates with the failover agents of the host computers H-1, H-2 . . . H-M in the cluster 103 to provide failover protection. In an embodiment, the failover protection system manages the failover agents in the cluster. In particular, the failover protection system may designate each failover agent as a master or a slave so that the host computer of that failover agent functions as a master node or a slave node. This designation may occur when a host computer is first added to the cluster 103 or when the number of host computers in the cluster changes, as explained below. In an embodiment, the failover protection system controls the failover operations when one or more failover agents in the cluster detect host computers that have failed so that applications on the failed host computers can be restarted on other host computers.

In some embodiments, the cluster management server 106 may be a physical computer. In other embodiments, the cluster management server may be implemented as one or more software programs running on one or more physical computers, such as the host computer 200 shown in FIG. 2, or VMs, such as the 220A, 220B . . . 220L. In an implementation, the cluster management server is a VMware vCenter™ server with at least some of the features available for such a server, and the failover protection system 108 in the cluster management server is VMware vSphere® High Availability (HA).

The dynamic heartbeating mechanism of the distributed computer system 100 in accordance with embodiments of the invention, which is provided mostly by the failover protection system 108 and the failover agents of the host computers H-1, H-2 . . . H-M in the cluster 103, uses selective cluster heartbeating process as the size of the cluster, i.e., the number of host computers in the cluster, grows or shrinks. In an embodiment, the dynamic heartbeating mechanism selectively operates in one of two heartbeating modes, which are two different heartbeating approaches to be applied depending on the cluster size. When the cluster size is equal to or below a threshold number, the dynamic heartbeating mechanism operates in an all-active heartbeating mode in which all the host computers in the cluster functions as master nodes. When the cluster size is greater than the threshold number, the dynamic heartbeating mechanism operates in a distributed heartbeating mode in which some of the host computers functions as master nodes and at least one of the host computers functions as a slave node.

The all-active heartbeating mode involves enabling each of the host computers in the cluster to function as a master node. When the cluster size is small, there is little need to worry about resources, such as compute and network resources, and thus, enabling master role on all the host computers minimizes failure response time. In this mode, since all the host computers operate as master nodes, there is no need for an election when any of the host computers fails, which reduces failure response time. In addition, changes in local inventory information are placed in the heartbeat messages which are transmitted to all the master nodes. Thus, the latest inventory information of each host computer in the cluster is known by all the host computers in the cluster. Consequently, each host computer has complete latest inventory information of all the host computers in the cluster. In an embodiment, as long as each heartbeat message can be transmitted in one Transmission Control Protocol (TCP) packet, which typically has a maximum size of 1,400 bytes), the inclusion of inventory information in the heartbeat message will not increase network usage. Furthermore, storage locks that can only be acquired by one host computer are used for failed host computers. Thus, this heartbeating mode can eliminate the delay of election, the need for inventory collection after host failure and possibility of false alarm.

Figure 3A:
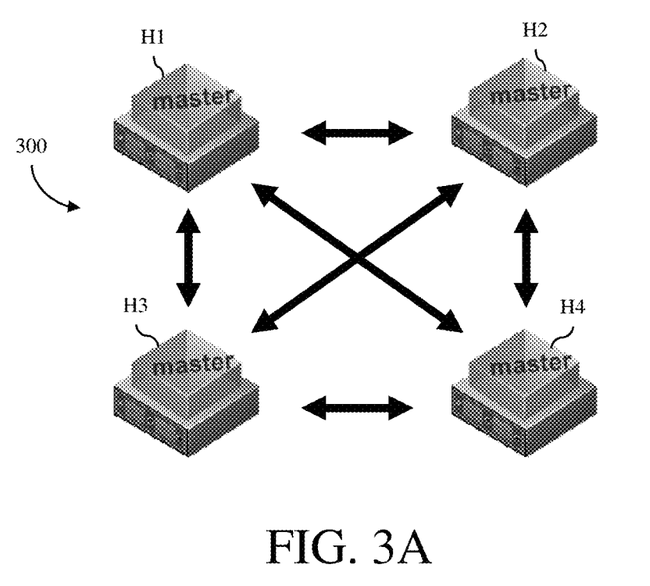
FIG. 3A is a diagram of a cluster of host computers operating in the all-active heartbeating mode in accordance with an embodiment of the invention.
Figure 3B:
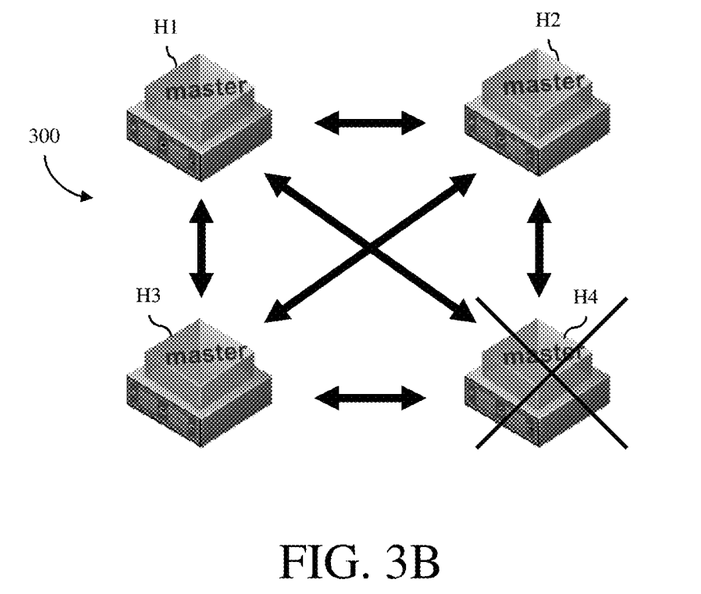
FIG. 3B is a diagram of the cluster of host computers operating in the all-active heartbeating mode in which one host computer has failed in accordance with an embodiment of the invention.

The all-active heartbeating mode is further described using an example depicted in FIGS. 3A and 3B. In the example, a small cluster 300 of host computers H1, H2, H3 and H4 is operating in the all-active heartbeating mode for the heartbeating process. Thus, all the host computers are enabled as master nodes with respect to heartbeating. In the all-active heartbeating mode, none of the host computers operates as a slave node. In FIG. 3A, all the host computers in the cluster are operating normally. In FIG. 3B, the host computer H4 has failed. Thus, the failure of the host computer H4 must be detected by the other host computers so that applications that were running on the host computer H4 can be failed over to one or more other host computers.

Figure 4:
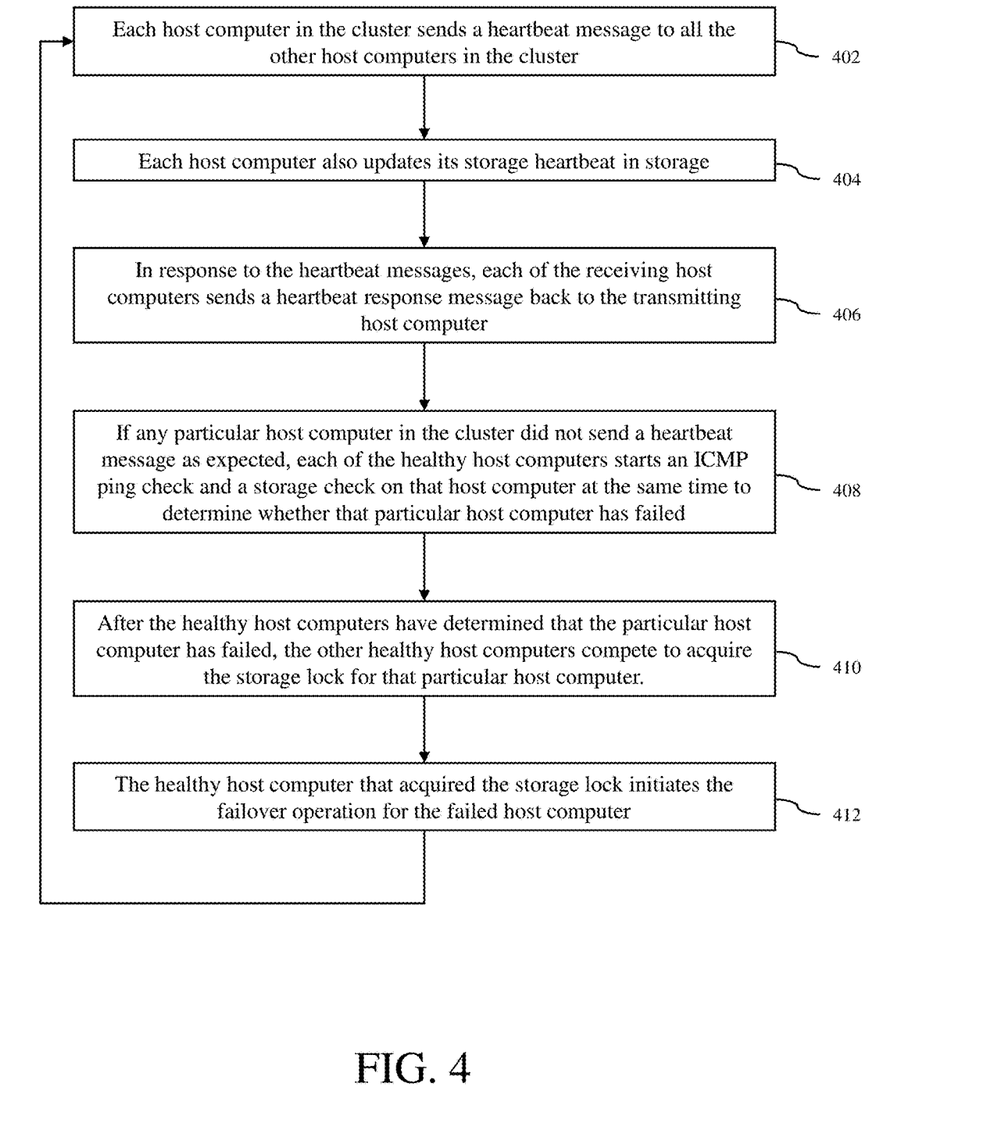
FIG. 4 is a flow diagram of a heartbeating process in an all-active heartbeating mode in accordance with an embodiment of the invention.

The heartbeating process in the all-active heartbeating mode in accordance with an embodiment of the invention is described with reference to the flow diagram of FIG. 4. At block 402, each host computer in the cluster sends a heartbeat message to all the other host computers in the cluster. If local inventory has changed for a particular host computer in the cluster, then that host computer will include the latest local inventory information in the heartbeat message. At block 404, each host computer also updates its storage heartbeat in storage, e.g., in a particular datastore in the storage 104. At block 406, in response to the heartbeat messages from the other host computers, each of the receiving host computers sends a heartbeat response message back to the transmitting host computer that had sent the heartbeat message.

Next, at block 408, if any particular host computer in the cluster did not send a heartbeat message as expected, each of the healthy host computers starts an ICMP ping check and a storage heartbeat check on that host computer at the same time to determine whether that particular host computer has failed. At block 410, after the healthy host computers have determined that the particular host computer has failed, the other healthy host computers compete to acquire the storage lock for that particular host computer. At block 412, the healthy host computer that acquired the storage lock initiates the failover operation for the failed host computer. The process then returns to block 402, so that the healthy host computers can again send heartbeat messages. Since only one healthy host computer in the cluster can successfully acquire the storage lock for each failed host computer in the cluster, there will be no inconsistency or false alarms.

The distributed heartbeating mode involves enabling some of the host computers in a cluster to function as master nodes and enabling at least one of the host computers in the cluster to function as a slave node. Thus, this mode can be viewed as having a two-level structure of host computers, where the master nodes are on the top level and the slave node on the bottom level. In an embodiment, the slave nodes are evenly distributed among the master nodes. When the cluster size is large, resource consumption can be significant if all the host computers are functioning master nodes. Thus, enabling some of the host computers to function as slave nodes reduces resource consumption. Using a single master node could further reduce resource consumption. However, a single master node cannot pool all slave nodes within a practical time period when the cluster size is too large. In addition, in the event of master node failure, a cluster wide election for new master node would be slow. Thus, the use of a single master node limits the scalability of clusters with respect to failover protection.

Figure 5A:
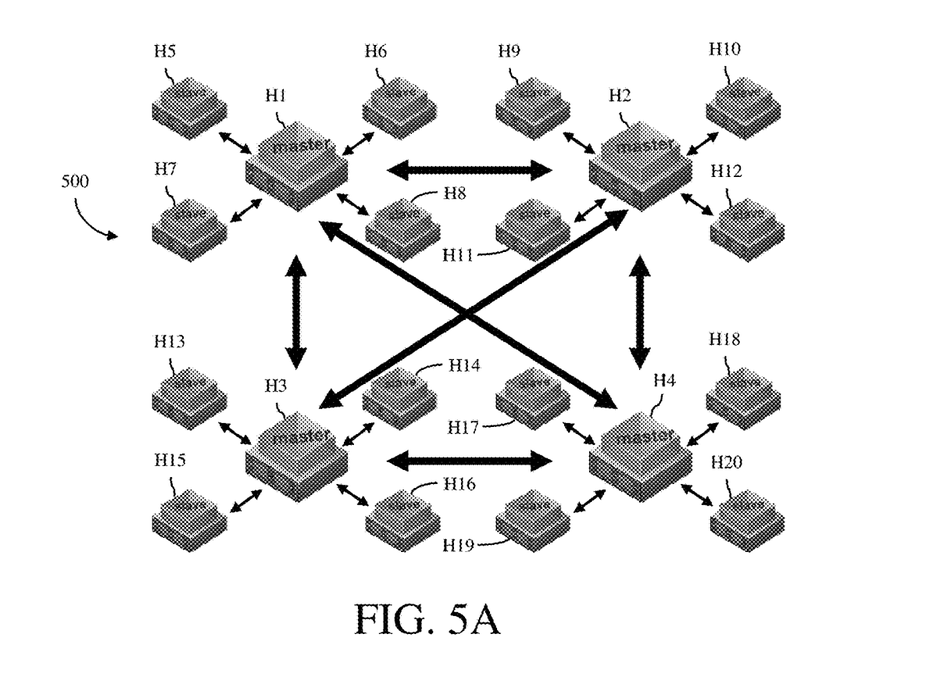
FIG. 5A is a diagram of a cluster of host computers operating in the distributed heartbeating mode in accordance with an embodiment of the invention.
Figure 5B:
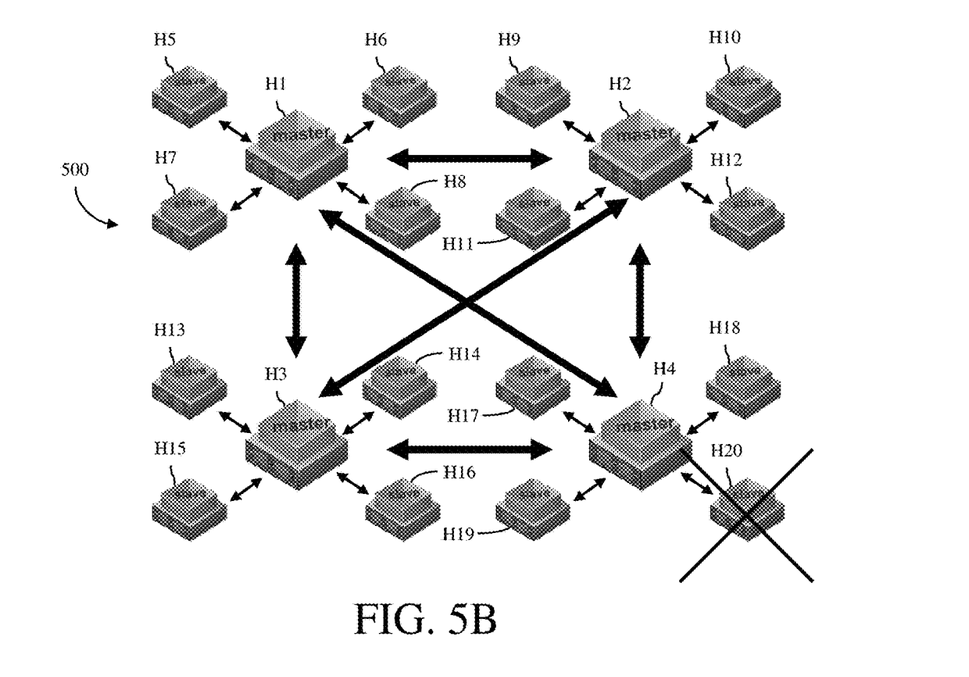
FIG. 5B is a diagram of the cluster of host computers operating in the distributed heartbeating mode in which one host computer functioning as a slave node has failed in accordance with an embodiment of the invention.
Figure 5C:
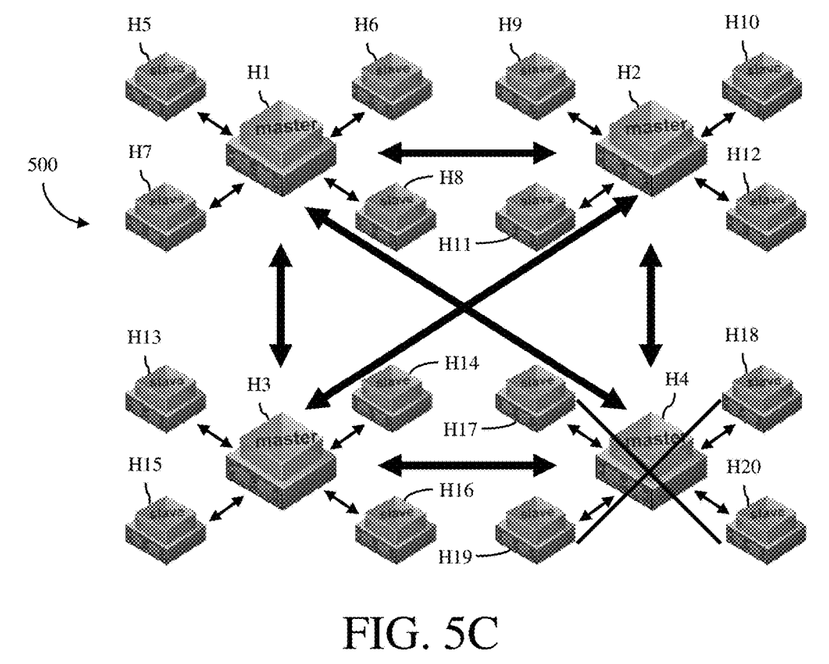
FIG. 5C is a diagram of the cluster of host computers operating in the distributed heartbeating mode in which one host computer functioning as a master node has failed in accordance with an embodiment of the invention.

The distributed heartbeating mode is further described using an example depicted in FIGS. 5A, 5B and 5C. In this example, a larger cluster 500 of host computers H1-H20 is operating in the distributed heartbeating mode for the heartbeating process. Thus, in the cluster 500, there are both master nodes and slave nodes. In this example, there are four master nodes H1-H4, where each master node has four slave nodes H5-H8, H9-H12, H13-16 or H17-H20. In FIG. 5A, all the host computers in the cluster are operating normally. In this state, the master nodes H1-H4 are exchanging heartbeat messages and heartbeat response messages. In FIG. 5B, one of the slave nodes, the slave node H20, has failed. Thus, the master node H4 responds to the suspected failure of the slave node H20 by performing an ICMP ping check and a storage heartbeat check to determine whether that slave node has indeed failed. If the master node H4 confirms that the slave node H20 has failed, the master node H4 initiates a failover operation for that slave node. In FIG. 5C, one of the master nodes, the master node H4, has failed. Thus, the other master nodes H1, H2 and H3 respond to the suspected failure of the master node H4 by individually performing an ICMP ping check and a storage heartbeat check on the master node H4 to determine whether the master node H4 has indeed failed. The master nodes then compete to acquire the storage lock for the failed master node H4. The master node that successfully acquires the storage lock initiates a failover operation for the failed master node H4. Meanwhile, the slave nodes perform an election to select a new master node once the slave nodes realize that the master node has failed, i.e., failed to respond to slave heartbeat messages. The new master node then takes over the functions of the failed master node.

Figure 6A:
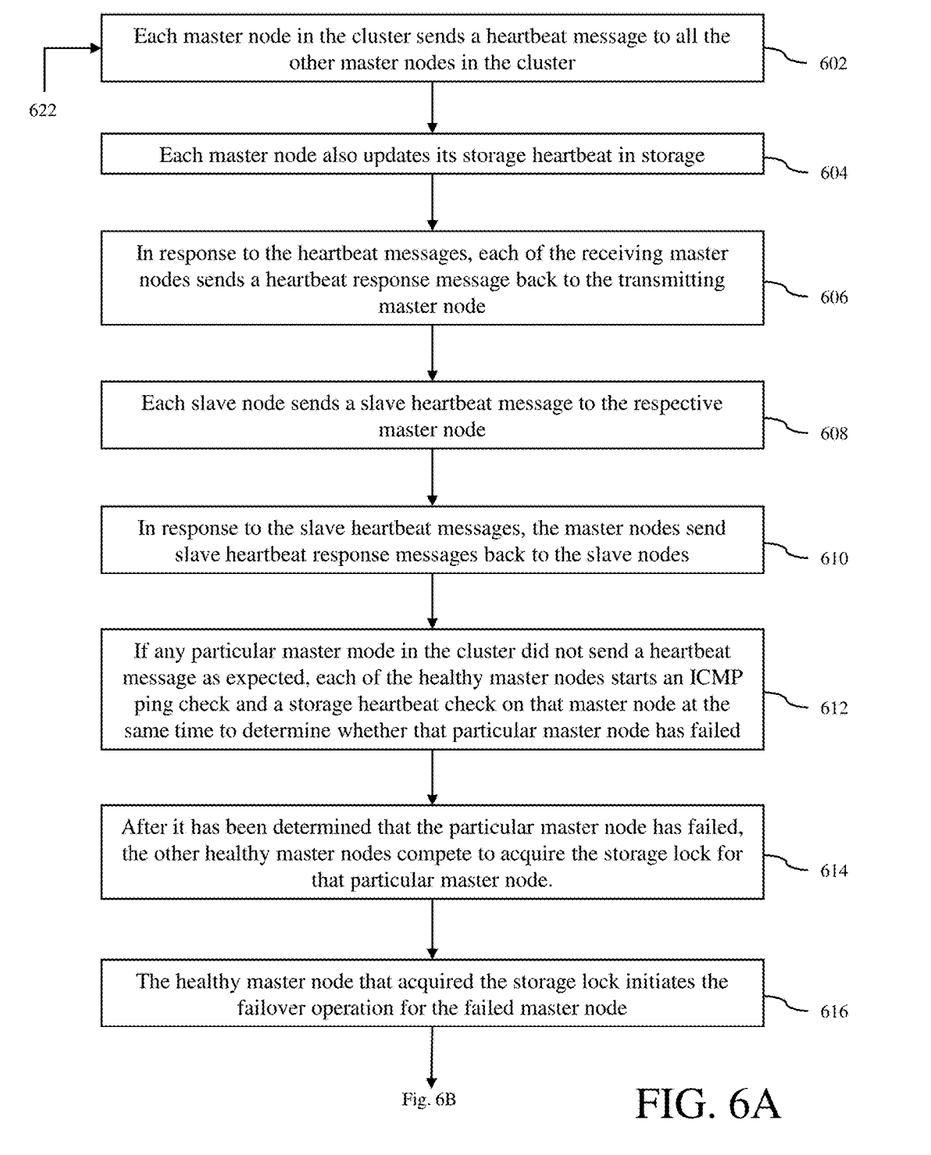
FIGS. 6A and 6B is a flow diagram of a heartbeating process in a distributed heartbeating mode in accordance with an embodiment of the invention.
Figure 6B:
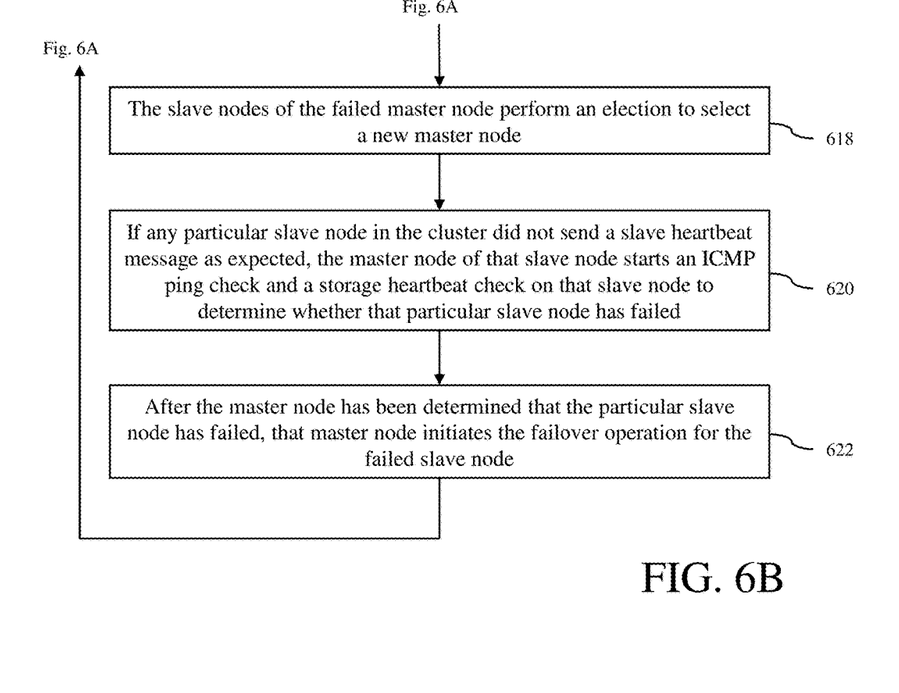

The heartbeating process in the distributed heartbeating mode in accordance with an embodiment of the invention is described with reference to the flow diagram of FIGS. 6A and 6B. At block 602, each master node in the cluster sends a heartbeat message to all the other master nodes in the cluster. If local inventory has changed for a particular master node in the cluster, then that master node will include the latest local inventory information in the heartbeat message. At block 604, each master node also updates its storage heartbeat in storage, e.g., in a particular datastore in the storage 104. At block 606, in response to the heartbeat messages from the other master nodes, each of the receiving master nodes sends a heartbeat response message back to the master node that had sent the heartbeat message. At block 608, each slave node sends a slave heartbeat message to the respective master node. At block 610, in response to the slave heartbeat messages from the slave nodes, the master nodes send slave heartbeat response messages back to the slave nodes.

At block 612, if any particular master mode in the cluster did not send a heartbeat message as expected, each of the healthy master nodes starts an ICMP ping check and a storage heartbeat check on that master node at the same time to determine whether that particular master node has failed. At block 614, after it has been determined that the particular master node has failed, the other healthy master nodes compete to acquire the storage lock for that particular master node. At block 616, the healthy master node that acquired the storage lock initiates the failover operation for the failed master node. At block 618, the slave nodes of the failed master node perform an election to select a new master node after the slave nodes realize that the master node has failed to respond to slave heartbeat messages within a predefined period. The new master node then takes over the functions of the failed master node.

At block 620, if any particular slave node in the cluster did not send a slave heartbeat message as expected, the master node of that slave node starts an ICMP ping check and a storage heartbeat check on that slave node to determine whether that particular slave node has failed. At block 622, after the master node has been determined that the particular slave node has failed, that master node initiates the failover operation for the failed slave node. The process then returns to block 602.

In the distributed heartbeating mode, if a master node and one or more of its slave nodes fail at the same time, the other master nodes will respond to the master node failure without significant delay. In addition, response to the failed slave node(s) would be delayed by at most one round election, which will be executed by the newly elected master node.

In an embodiment, the failover protection system 108 in the cluster management server 106 implements either the all-active heartbeating mode or the distributed heartbeating based on an algorithm using the following assumption:

node_number is the current node number of cluster;
L is a constant that indicates a large scale of cluster size; i.e. L = 32;
node_limit is the max number of nodes supported; i.e., node_limit = L^2 =
32*32=1024;

The algorithm is as follow:

If cluster size is small (1 < node_number <= L):
    Change to all-active heartbeating mode;
Else if cluster size is large (L < node_number < = node_limit):
    Change to distributed heartbeating mode;
Else
    Cannot add more nodes into cluster;

The entering condition for the above algorithm is when the cluster size changes, which may be when a new host computer joins the cluster, when an existing host computer leaves the cluster or when the cluster is reconfigured.

In a particular implementation, the cluster is set or programmed so that one master host computer can have at most L slaves, which balances performance and scale. In this implementation, the cluster size can be as large as $L^2$, i.e., 32*32=1024.

When the cluster size grows from L to L+1, the heartbeating mechanism changes from the all-active heartbeating mode to the distributed heartbeating mode. Thus, the last added host computer will be the first slave node of the cluster, which will be allocated to one of the master nodes. In an embodiment, all the slave nodes are evenly allocated to the master nodes by a hash algorithm, e.g., bucket=slave#id/master#count. If the chosen master node already has L slave node, then the next master node will be chosen. When the cluster size shrinks from L+1 to L, the heartbeating mechanism changes back to the all-active heartbeating mode by changing any slave nodes to master nodes.

By operating in the all-active heartbeating mode when the cluster size is relatively small, the performance of the heartbeating mechanism for failover protection in the distributed computer system 100 is improved. By operating in the distributed heartbeating mode when the cluster size is relatively large, the heartbeating mechanism for failover protection can accommodate larger number of host computers without significant impact on the performance. Thus, by switching between the all-active heartbeating mode and the distributed heartbeating mode as the cluster size changes, the heartbeating mechanism of the distributed computer system improves both performance and scalability.

Figure 7:
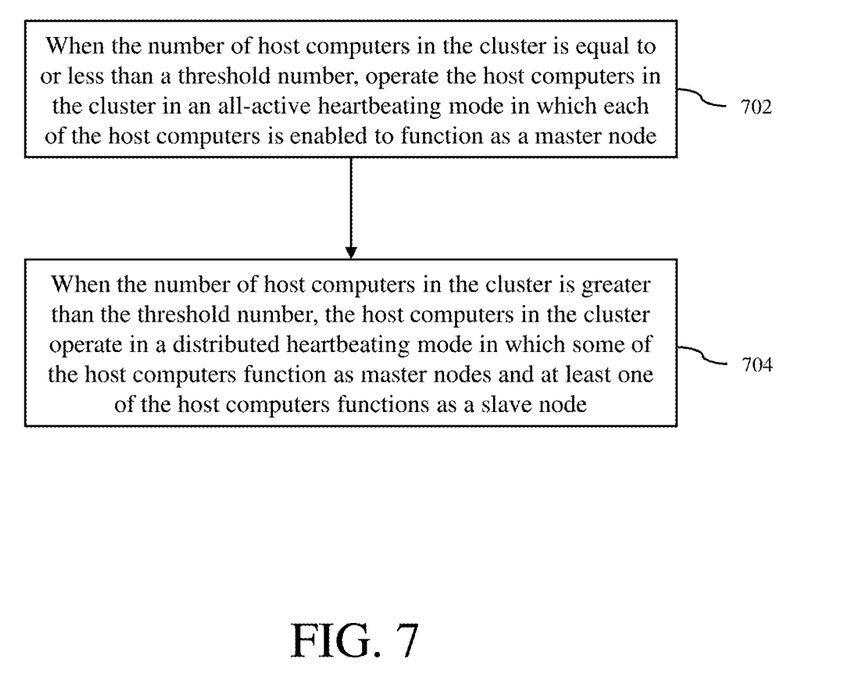
FIG. 7 is a process flow diagram of a method for providing failover protection for a cluster of host computers in accordance with an embodiment of the invention.

A method for providing failover protection for a cluster of host computers in accordance with an embodiment of the invention is now described with reference to the process flow diagram of FIG. 7. At block 702, when the number of host computers in the cluster is equal to or less than a threshold number, the host computers in the cluster operate in an all-active heartbeating mode in which each of the host computers is enabled to function as a master node. At block 704, when the number of host computers in the cluster is greater than the threshold number, the host computers in the cluster operate in a distributed heartbeating mode in which some of the host computers function as master nodes and at least one of the host computers functions as a slave node.

Although the operations of the method(s) herein are shown and described in a particular order, such as those shown and described with respect to FIGS. 4, 6A, 6B and 7, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Also, some of the steps can be repeated multiple times.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a non-transitory computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for providing failover protection for a cluster of host computers, the method comprising:
    when the number of host computers in the cluster is equal to or less than a threshold number, operating the host computers in the cluster in an all-active heartbeating mode in which each of the host computers functions as a master node, including controlling a failover agent in each of the host computers to operate as a master so that each of the host computers functions as a master node; and
    when the number of host computers in the cluster is greater than the threshold number, operating the host computers in the cluster in a distributed heartbeating mode in which at least one of the host computers functions as a master node and at least one of the host computers functions as a slave node, including controlling the failover agent in each of the host computers to operate as one of a master and a slave so that at least one of the host computers functions as a master node and at least one of the host computers functions as a slave node.

2. The method of claim 1, wherein operating the host computers in the cluster in the all-active heartbeating mode or in the distributed heartbeating mode includes periodically sending a heartbeat message from each of the master nodes in the cluster to other master nodes in the cluster and sending a heartbeat response message from each of the master nodes that received the heartbeat message.

3. The method of claim 2, wherein the heartbeat message includes updated local inventory information of a master mode sending the heartbeat message.

4. The method of claim 2, wherein operating the host computers in the cluster in the all-active heartbeating mode or in the distributed heartbeating mode further includes performing at least one of a ping check and a storage heartbeat check on a particular master node in the cluster that did not send a heartbeat message to determine whether the particular master node has failed.

5. The method of claim 4, wherein operating the host computers in the cluster in the all-active heartbeating mode or in the distributed heartbeating mode further includes, after the particular master node has been determined to have failed, competing to acquire a storage lock of the particular master node by other healthy master nodes in the cluster and initiating a failover operation on the particular master node by a healthy master node in the cluster that has acquired the storage lock.

6. The method of claim 5, wherein operating the host computers in the cluster in the distributed heartbeating mode further includes periodically sending a slave heartbeat message from each slave node in the cluster to an associated master node in the cluster and sending a slave heartbeat response message from the associated master node back to each slave node.

7. The method of claim 6, wherein operating the host computers in the cluster in the distributed heartbeating mode further includes performing at least one of a ping check and a storage heartbeat check on a particular slave node in the cluster that did not send a heartbeat message to determine whether the particular slave node has failed.

8. The method of claim 7, wherein operating the host computers in the cluster in the distributed heartbeating mode further includes, after the particular slave node has been determined to have failed, initiating a failover operation on the particular slave node by the associated master node.

9. A non-transitory computer-readable storage medium containing program instructions for a method for providing failover protection for a cluster of host computers, wherein execution of the program instructions by one or more processors of a computer system causes the one or more processors to perform steps comprising:
when the number of host computers in the cluster is equal to or less than a threshold number, operating the host computers in the cluster in an all-active heartbeating mode in which each of the host computers functions as a master node, including controlling a failover agent in each of the host computers to operate as a master so that each of the host computers functions as a master node; and
when the number of host computers in the cluster is greater than the threshold number, operating the host computers in the cluster in a distributed heartbeating mode in which at least one of the host computers functions as a master node and at least one of the host computers functions as a slave node, including controlling the failover agent in each of the host computers to operate as one of a master and a slave so that at least one of the host computers functions as a master node and at least one of the host computers functions as a slave node.

10. The computer-readable storage medium of claim 9, wherein operating the host computers in the cluster in the all-active heartbeating mode or in the distributed heartbeating mode includes periodically sending a heartbeat message from each of the master nodes in the cluster to other master nodes in the cluster and sending a heartbeat response message from each of the master nodes that received the heartbeat message.

11. The computer-readable storage medium of claim 10, wherein the heartbeat message includes updated local inventory information of a master mode sending the heartbeat message.

12. The computer-readable storage medium of claim 10, wherein operating the host computers in the cluster in the all-active heartbeating mode or in the distributed heartbeating mode further includes performing at least one of a ping check and a storage heartbeat check on a particular master node in the cluster that did not send a heartbeat message to determine whether the particular master node has failed.

13. The computer-readable storage medium of claim 12, wherein operating the host computers in the cluster in the all-active heartbeating mode or in the distributed heartbeating mode further includes, after the particular master node has been determined to have failed, competing to acquire a storage lock of the particular master node by other healthy master nodes in the cluster and initiating a failover operation on the particular master node by a healthy master node in the cluster that has acquired the storage lock.

14. The computer-readable storage medium of claim 13, wherein operating the host computers in the cluster in the distributed heartbeating mode further includes periodically sending a slave heartbeat message from each slave node in the cluster to an associated master node in the cluster and sending a slave heartbeat response message from the associated master node back to each slave node.

15. The computer-readable storage medium of claim 14, wherein operating the host computers in the cluster in the distributed heartbeating mode further includes performing at least one of a ping check and a storage heartbeat check on a particular slave node in the cluster that did not send a heartbeat message to determine whether the particular slave node has failed.

16. The computer-readable storage medium of claim 15, wherein operating the host computers in the cluster in the distributed heartbeating mode further includes, after the particular slave node has been determined to have failed, initiating a failover operation on the particular slave node by the associated master node.

17. A distributed computer system comprising:
a cluster of host computers; and
a management server operatively connected to the host computers, the management server comprising:
memory; and
a processor configured to:
when the number of host computers in the cluster is equal to or less than a threshold number, manage the host computers in the cluster to operate in an all-active heartbeating mode in which each of the host computers functions as a master node, including controlling a failover agent in each of the host computers to operate as a master so that each of the host computers functions as a master node; and
when the number of host computers in the cluster is greater than the threshold number, manage the host computers in the cluster to operate in a distributed heartbeating mode in which at least one of the host computers functions as a master node and at least one of the host computers functions as a slave node, including controlling the failover agent in each of the host computers to operate as one of a master and a slave so that at least one of the host computers functions as a master node and at least one of the host computers functions as a slave node.

18. The distributed computer system of claim 17, wherein the processor is configured to manage the host computers in the clusters so that each of the master nodes in the cluster periodically sends a heartbeat message to other master nodes in the cluster and each of the master nodes that received the heartbeat message sends a heartbeat response message.

19. The distributed computer system of claim 17, wherein the heartbeat message includes updated local inventory information of a master mode sending the heartbeat message.

20. The distributed computer system of claim 19, wherein the processor is configured to manage the host computers in the clusters so that healthy master nodes in the cluster perform at least one of a ping check and a storage heartbeat check on a particular master node in the cluster that did not send a heartbeat message to determine whether the particular master node has failed.

21. The distributed computer system of claim 20, wherein the processor is configured to manage the host computers in the clusters so that, after the particular master node has been determined to have failed, other healthy master nodes in the cluster compete to acquire a storage lock of the particular master node and a healthy master node in the cluster that has acquired the storage lock initiates a failover operation on the particular master node.

22. The distributed computer system of claim 21, wherein the processor is configured to manage the host computers in the clusters so that each slave node in the cluster periodically sends a slave heartbeat message to an associated master node in the cluster and the associated master nodes sends a slave heartbeat response message back to each slave node.

23. The distributed computer system of claim 22, wherein the processor is configured to manage the host computers in the clusters so that the associated master node performs at least one of a ping check and a storage heartbeat check on a particular slave node in the cluster that did not send a heartbeat message to determine whether the particular slave node has failed.

24. The distributed computer system of claim 23, wherein the processor is configured to manage the host computers in the clusters so that, after the particular slave node has been determined to have failed, the associated master node initiates a failover operation on the particular slave node.

* * * * *